United States Patent
Hong et al.

(10) Patent No.: US 10,433,279 B2
(45) Date of Patent: Oct. 1, 2019

(54) METHOD OF RECEIVING SINGLE-CELL MULTICAST DATA AND APPARATUS FOR SAME

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 13 days.

(21) Appl. No.: 15/674,734

(22) Filed: Aug. 11, 2017

(65) Prior Publication Data
US 2018/0049160 A1    Feb. 15, 2018

(30) Foreign Application Priority Data

Aug. 11, 2016    (KR) ................. 10-2016-0102623
Aug. 7, 2017    (KR) ................. 10-2017-0099395

(51) Int. Cl.
*H04W 72/00* (2009.01)
*H04W 4/70* (2018.01)
*H04W 4/06* (2009.01)

(52) U.S. Cl.
CPC ........... *H04W 72/005* (2013.01); *H04W 4/06* (2013.01); *H04W 4/70* (2018.02); *Y02D 70/00* (2018.01);
(Continued)

(58) Field of Classification Search
CPC ....... H04W 4/06; H04W 72/005; H04W 4/70; H04W 72/00; H04W 72/04
See application file for complete search history.

(56) References Cited

U.S. PATENT DOCUMENTS

2009/0149164 A1    6/2009 Cai
2010/0208660 A1*   8/2010 Ji .................... H04W 52/0225
                                                       370/328
(Continued)

FOREIGN PATENT DOCUMENTS

KR    10-2012-0018818 A    3/2012
KR    10-2012-0025538 A    3/2012
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.2.0 (Jun. 2016), pp. 1-623.
(Continued)

*Primary Examiner* — Anez C Ebrahim
(74) *Attorney, Agent, or Firm* — IP Legal Services, LLC (57) ABSTRACT

Disclosed are a detailed method and apparatus for receiving multicast data by an IoT UE required to operate with low power and at low cost. Further disclosed are a method and an apparatus for processing multicast data by a Bandwidth-reduced Low-complexity (BL) UE, a Coverage-Enhancement (CE) UE, or a NarrowBand-IoT (NB-IoT) UE. A method of receiving single-cell multicast data by a UE includes receiving carrier information for Single Cell-Multicast Control Channel (SC-MCCH) reception through system information, monitoring SC-MCCH scheduling information on a PDCCH based on the carrier information, and receiving an SC-MCCH on a PDSCH based on the SC-MCCH scheduling information. The UE is configured to be allowed to access a network service having a channel bandwidth limited to 200 kHz or lower or to operate in a bandwidth limited to 6 PRBs.

9 Claims, 5 Drawing Sheets

(52) U.S. Cl.
CPC ...... *Y02D 70/1262* (2018.01); *Y02D 70/1264* (2018.01); *Y02D 70/20* (2018.01); *Y02D 70/21* (2018.01)

(56) References Cited

U.S. PATENT DOCUMENTS

| | | |
|---|---|---|
| 2010/0255859 A1 | 10/2010 | Park et al. |
| 2012/0093051 A1 | 4/2012 | Xu |
| 2012/0100853 A1* | 4/2012 | Xiong ................... H04W 48/16 455/436 |
| 2012/0230347 A1 | 9/2012 | Gao et al. |
| 2015/0146604 A1 | 5/2015 | Kim et al. |
| 2017/0325277 A1* | 11/2017 | Fujishiro ................. H04W 4/06 |
| 2018/0167917 A1* | 6/2018 | Suzuki ................. H04W 72/04 |

FOREIGN PATENT DOCUMENTS

| | | |
|---|---|---|
| KR | 10-2012-0061883 A | 6/2012 |
| KR | 10-1517744 B1 | 5/2015 |
| KR | 10-1520683 B1 | 5/2015 |

OTHER PUBLICATIONS

Nokia et al., "Rel-14 NB-IoT and eMTC enhancement considerations", RP-161037, 3GPP TSG RAN Meeting #72, Busan, Korea, Mar. 13-16, 2016, pp. 1-3.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.4.0 (Jun. 2016), pp. 1-310.

* cited by examiner

METHOD OF RECEIVING SINGLE-CELL MULTICAST DATA AND APPARATUS FOR SAME

CROSS REFERENCE TO RELATED APPLICATION

This application claims priority from Korean Patent Application Nos. 10-2016-0102623, filed on Aug. 11, 2016 and 10-2017-0099395, filed on Aug. 7, 2017, which is hereby incorporated by reference for all purposes as if fully set forth herein.

BACKGROUND OF THE INVENTION

1. Field of the Invention

The present disclosure relates to a method and an apparatus for receiving multicast data by an Internet of Thing User equipment (IoT UE), which is required to operate with low power at low cost. More particularly, the present disclosure relates to a method of processing multicast data by a Bandwidth-reduced Low-complexity (BL) UE, a Coverage-Enhancement (CE) UE, or a NarrowBand-IoT (NB-IoT) UE and an apparatus for the same.

2. Description of the Related Art

The number of Internet of Things (IoT) devices connected via the network has increased all around the world. Against this background, it is necessary to determine technology for processing data transmission/reception by the rapidly proliferating IoT devices.

Specifically, a large number of IoT devices are installed in a wide area and the IoT devices require stable network connections with low power consumption at low cost. Further, IoT devices may have a characteristic of intermittently transmitting and receiving a small amount of data. Accordingly, when the typicaltypical LTE or LTE-Advanced technology is applied, unnecessary power consumption may increase, or the cost of such a device itself may also increase. Further, there is a limitation on supporting communication of a large number of IoT devices in an environment in which licensed band radio resources are limited.

In order to solve the problem, NarrowBand-IoT (NB IoT) technology or CE UE technology based on LTE network technology has been developed.

Particularly, in the case of NB-IoT, communication is performed using a narrow band in order to increase device acceptance, reduce power consumption, and decrease costs. Further, coverage may increase effectively through repetitive data transmission technology. In addition, due to abrupt increment in demand for UEs capable of operating in a wide coverage area, it may be necessary to develop a data processing method for the same.

Meanwhile, the typicaltypical NB-IoT UE, BL UE, or CE UE is required to operate in a wide coverage area with low power. Thus, the typical NB-IoT UE, BL UE, or CE UE is able to support only unicast data transmission and reception. However, as multicast data transmission and reception by the above-described UEs has come to be required, it may be necessary to develop a detailed method of processing multicast data by the NB-IoT UE, the BL UE, and the CE UE.

SUMMARY OF THE INVENTION

An embodiment made under the above-described background proposes a method and an apparatus for processing multicast data by a UE configured to operate in a wide coverage area in a narrow band with low power, such as an NB-IoT UE.

In accordance with an aspect of the present disclosure, a method of receiving single-cell multicast data by a UE is provided. The method includes: receiving carrier information for Single Cell-Multicast Control Channel (SC-MCCH) reception through system information; monitoring SC-MCCH scheduling information on a physical downlink control channel (PDCCH) based on the carrier information; and receiving an SC-MCCH on a physical downlink shared channel (PDSCH) based on the SC-MCCH scheduling information, wherein the UE is configured to be allowed to access a network service having a channel bandwidth limited to about 200 kHz or lower or to operate in a bandwidth limited to 6 physical resource blocks (PRBs).

In accordance with another aspect of the present disclosure, a method of transmitting single-cell multicast data by a BS is provided. The method includes: transmitting carrier information for Single Cell-Multicast Control Channel (SC-MCCH) reception through system information; transmitting a PDCCH including SC-MCCH scheduling information to a UE based on the carrier information; and transmitting a PDSCH including an SC-MCCH to the UE based on the SC-MCCH scheduling information, wherein the UE is configured to be allowed to access a network service having a channel bandwidth limited to 200 kHz or lower or to operate in a bandwidth limited to 6 PRBs.

In accordance with another aspect of the present disclosure, a UE for receiving single-cell multicast data is provided. The UE includes: a receiver configured to receive carrier information for Single Cell-Multicast Control Channel (SC-MCCH) reception through system information; and a controller configured to monitor SC-MCCH scheduling information on a PDCCH based on the carrier information, wherein the receiver receives an SC-MCCH on a PDSCH based on the SC-MCCH scheduling information, and the UE is configured to be allowed to access a network service having a channel bandwidth limited to 200 kHz or lower or to operate in a bandwidth limited to 6 PRBs.

In accordance with another aspect of the present disclosure, a BS for transmitting single-cell multicast data is provided. The BS includes: a transmitter configured to transmit carrier information for Single Cell-Multicast Control Channel (SC-MCCH) reception through system information, transmit a PDCCH including SC-MCCH scheduling information to a UE based on the carrier information, and transmit a PDSCH including an SC-MCCH to the UE based on the SC-MCCH scheduling information, wherein the BS is configured to be allowed to access a network service having a channel bandwidth limited to 200 kHz or lower or to operate in a bandwidth limited to 6 PRBs.

According to the above-described embodiment, the NB-IoT UE, the BL UE, or the CE UE can efficiently process multicast data traffic through a Single-Cell Point-to Multipoint (SC-PTM) transmission scheme.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, an machine type communication (MTC) terminal may refer to a terminal that supports low cost (or low complexity), a terminal that supports coverage enhancement, or the like. In the present specifications, the MTC terminal may refer to a terminal that supports low cost (or low complexity) and coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. i) the base station may be a device itself that provides a megacell, a macrocell, a microcell, a picocell, a femtocell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPD-CCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

3GPP Release-12 and Release-13 documents have standardized a Bandwidth-reduced Low-complexity (BL) UE and Coverage-Enhancement (CE) UE technology. A Low Complexity (LC) UE refers to a UE targeted for low-end application at low profit, low speed, and low delay sensitivity, such as some MTC UEs. The LC UE has Tx and Rx capabilities reduced in comparison with other categories of UEs. The BL UE operates in a predetermined LTE system band having a limited channel bandwidth of 6 PRBs corresponding to an available maximum channel bandwidth in 1.4 MHz LTE system. The CE UE requires an enhanced coverage function to access a cell.

Meanwhile, 3GPP Release-13 has standardized Narrow-Band Internet of Things (NB-IoT) technology. This is for the purpose of specifying radio access for cellular IoT, which includes improved indoor coverage, support of large-scale low-speed UE, low delay sensitivity, very low cost UE, low power consumption, and optimized network structure.

The BL UE, the CE UE, or the NB-IoT UE provides functions for allowing the 3GPP system to rapidly penetrate a low-cost IoT market. Accordingly, some functions provided to the general LTE UE that provides a mobile broadband service are not provided to the BL UE, the CE UE, or the NB-IoT UE. For example, multicast transmission (or MBMS service or SC-PTM transmission (hereinafter, the following description will be made based on SC-PTM for convenience of description but MBSFN transmission is also included in the scope of the present disclosure) provided to the general UE was not provided to the Rel-13 BL UE, the CE UE, or the NB-IoT UE.

In LTE, MBMS transmission uses one of MBSFN transmission and SC-PTM transmission. A Multi-cell/multicast Coordination Entity (MCE) determines whether to use SC-PTM or MBSFN for each MBMS session. SC-PTM is transmitted by MBMS in single-cell coverage. In SC-PTM, one control channel SC-MCCH and one or more traffic channels SC-MTCH(s) are provided. One control channel SC-MCCH and one or more traffic channels SC-MTCH(s) are mapped onto DL-SCH.

The UE may identify SC-MCCH transmission on a PDCCH based on a Single-Cell (SC)-RNTI. The SC-MCCH refers to a control channel for transmitting control information associated with MBMS transmission through SC-PTM or the control information. The BL UE, the CE UE, or the NB-IoT UE should acquire the SC-MCCH and recognize relevant SC traffic channel information in order to receive data using SC-PTM. The BL UE, the CE UE, or the NB-IoT UE that receives data through repeated transmission (repetitions) is not able to acquire the SC-MCCH through the typical method. For example, the NB-IoT UE provides only cross-subframe scheduling. Accordingly, the NB-IoT UE is not able to receive the SC-MCCH.

As described above, in the related art, multicast transmission provided to the general UE was not provided to the IoT/MTC UE (for example, the BL UE, the CE UE, or the NB-IoT UE). Accordingly, the BL UE, the CE UE, or the NB-IoT UE that receives data through repetition transmission is not able to acquire the SC-MCCH in the related art. Therefore, when software/firmware update is provided to a plurality of IoT UEs located in a single region, individual unicast transmission should be performed.

An aspect of the present disclosure made to solve the problem is to provide a method and an apparatus for providing multicast transmission, which is provided to the general UE, to the NB-IoT UE. Particularly, an aspect of the present disclosure is to provide a method and an apparatus for acquiring the SC-MCCH by the BL UE, the CE UE, or the NB-IoT UE.

Hereinafter, a method of receiving multicast data by the BL UE, the CE UE, or the NB-IoT UE will be described in detail. Further, in this specification, the BL UE, the CE UE, or the NB-IoT UE is referred to as the UE, and the typical LTE UE, to which low-power and low-cost technology is not applied, is referred to as the general UE or the LTE UE for convenience of description.

In addition, a downlink control channel (PDCCH) described below includes terms varying depending on respective UEs and should be construed as having a meaning including an MPDCCH and an NPDCCH. Also, a downlink data channel (PDSCH) includes terms varying depending on respective UEs and should be construed as having a meaning including an MPDSCH and an NPDSCH.

That is, the terms referring to the channel, such as the downlink control channel or the downlink data channel, and data may vary depending on the UE category (for example, the BL UE, the CE UE, or the NB-IoT UE), and are used to have a meaning including all terms varying depending on the UE category.

Further, hereinafter, an embodiment for the NB-IoT UE will be mainly described. This is only for convenience of description, but the BL UE or the CE UE is also included in the scope of the present disclosure.

When a UE interested in reception of an MBMS service through SC-MRB enters the cell broadcasting system information block type 20 (SystemInformationBlockType20), an SC-MCCH information acquisition procedure is applied.

In the related art, the UE is able to identify SC-MCCH transmission on a PDCCH based on a Single Cell (SC)-RNTI. The UE uses the SC-RNTI for the PDCCH associated with a DL-SCH to address the SC-MCCH broadcasted on the DL-SCH. The BS broadcasts information for receiving SC-MCCH information through system information block type 20. System information block type 20 may include information on i) sc-mcch-RepetitionPeriod information that defines an interval between SC-MCCH information transmission, ii) an sc-mcch-Offset indicating a radio frame in which the SC-MCCH is scheduled, iii) sc-mcch-FirstSubframe information indicating a first subframe in which the SC-MCCH is scheduled, and iv) sc-mcch-duration information indicating the duration for which the SC-MCCH can be scheduled, starting from a subframe indicated by sc-mcch-FirstSubframe. Detailed definitions thereof are as shown in [Table 1].

In the related art, for bandwidth-reduced operation, an MTC Physical Downlink Control Channel (MPDCCH) is used, and the MPDCCH carries common signaling and UE-specific signaling. The MPDCCH supports an RA-RNTI, an SI-RNTI, a P-RNTI, a C-RNTI, a temporary C-RNTI, and an SPS C-RNTI.

In the related art, for the NB-IoT, a Narrowband Physical Downlink Control Channel (NPDCCH) is located at an available system of the configured subframe. The NPDCCH supports a C-RNTI, a temporary C-RNTI, a P-RNTI, and an RA-RNTI.

In the related art, the following downlink scheduling technology is applied to the NB-IoT.

Scheduling information for downlink data is transmitted on a downlink physical control channel (NPDCCH). The scheduled downlink data is transmitted on a shared data channel (NPDSCH).

Only cross-subframe scheduling is provided. Cross-carrier scheduling is not supported. The transmission duration is variable with respect to the number of subframes for the NPDCCH and the NPDSCH.

The transmission duration is semi-static with respect to the number of subframes for the NPDCCH, and is indicated for the NPDSCH as part of the scheduling information transmitted on the NPDCCH.

The start time of the NPDSCH relative to the NPDCCH is signaled as part of the scheduling message.

Figure 1:
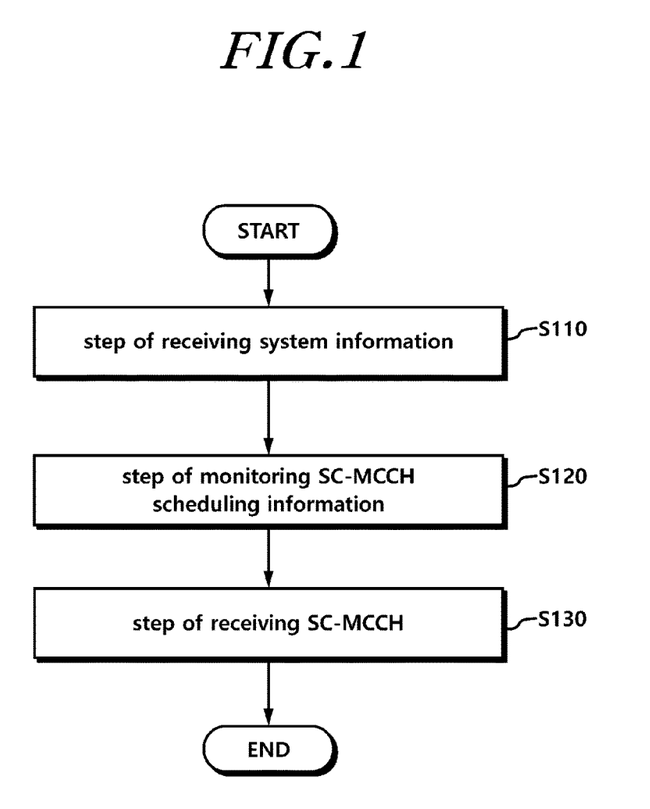
FIG. 1 is a flowchart illustrating operation of a user equipment (UE) according to an embodiment.

FIG. 1 is a flowchart illustrating operations of a user equipment (UE) according to an embodiment.

In a method of receiving single-cell multicast-data, a UE according to an embodiment may perform i) receiving carrier information for Single Cell-Multicast Control Channel (SC-MCCH) reception through system information, ii) monitoring SC-MCCH scheduling information on a PDCCH based on the carrier information, and iii) receiving the SC-MCCH on a PDSCH based on the SC-MCCH scheduling information. Further, the UE is configured to be allowed to access a network service having a channel bandwidth limited to about 200 kHz or lower or configured to operate in a bandwidth limited to 6 physical resource blocks (PRBs).

Referring to FIG. 1, the UE receives carrier information for SC-MCCH reception through system information in S110. For example, the UE may receive system information block type 20 (SystemInformationBlockType20). The sys-

TABLE 1

SystemInformationBlockType20 field descriptions sc-mcch-ModificationPeriod
Defines periodically appearing boundaries, i.e. radio frames for which SFN mod sc-mcch-ModificationPeriod = 0. The contents of different transmissions of SC-MCCH information can only be different if there is at least one such boundary in-between them. Value rf2 corresponds to 2 radio frames, value rf4 corresponds to 4 radio frames and so on.
sc-mcch-duration
Indicates, starting from the subframe indicated by sc-mcch-FirstSubframe, the duration during which SC-MCCH may be scheduled in non-MBSFN subframes. Absence of this IE means that SC-MCCH is only scheduled in the subframe indicated by sc-mcch-FirstSubframe.
sc-mcch-Offset
Indicates, together with the sc-mcch-RepetitionPeriod, the radio frames in which SC-MCCH is scheduled i.e. SC-MCCH is scheduled in radio frames for which: SFN mod sc-mcch-RepetitionPeriod = sc-mcch-Offset.
sc-mcch-FirstSubframe
Indicates the first subframe in which SC-MCCH is scheduled
sc-mcch-RepetitionPeriod
Defines the interval between transmissions of SC-MCCH information, in radio frames, Value rf2 corresponds to 2 radio frames, rf4 corresponds to 4 radio frames and so on.

tem information may contain various pieces of information for SC-MCCH reception by the UE.

For example, the system information may contain the maximum number of repeated transmissions of the PDCCH including SC-MCCH scheduling information. For example, the system information may contain information on the maximum number of repeated transmissions of the PDCCH including scheduling information of a subframe in which the SC-MCCH is transmitted. That is, the SC-MCCH scheduling information is received by the UE through the PDCCH, and the UE may identify the SC-MCCH scheduling information by repeatedly receiving the corresponding PDCCH through the maximum number of repeated transmissions of the PDCCH of the system information.

For another example, the system information may contain start subframe information in PDCCH common search space for monitoring the SC-MCCH scheduling information. For example, the system information may contain information on a common search space of the PDCCH including the SC-MCCH scheduling information. The UE may identify information on the start subframe in the common search space of the repeatedly received PDCCH as the system information and monitor the corresponding common search space to identify the SC-MCCH scheduling information.

The UE monitors the SC-MCCH scheduling information on the PDCCH based on the carrier information in S120. For example, the UE may identify the SC-MCCH scheduling information through the PDCCH by identifying at least one of the maximum number of repeated transmissions of the PDCCH including the SC-MCCH scheduling information and the start subframe information in the common search space through the system information. As described above, the SC-MCCH is mapped to the DL-SCH and transmitted to the UE, so that the UE may receive the SC-MCCH through the PDSCH based on the SC-MCCH scheduling information transmitted on the PDCCH. To this end, the UE performs monitoring to receive the SC-MCCH scheduling information on the PDCCH. Meanwhile, the SC-MCCH scheduling information may be identified using a Single-Cell Radio Network Temporary Identifier (SC-RNTI).

The UE receives the SC-MCCH on the PDSCH based on the SC-MCCH scheduling information in S130. For example, the UE may receive the SC-MCCH on the PDSCH through the identified SC-MCCH scheduling information. As described above, the SC-MCCH may be repeatedly received in a plurality of subframes through the PDSCH.

Thereafter, the UE may receive single-cell multicast control information of the SC-MCCH and receive an SC-MTCH based on the single-cell multicast control information. The SC-MTCH may be also repeatedly received through a plurality of subframes.

Meanwhile, the UE is configured to be allowed to access a network service having a channel bandwidth limited to about 200 kHz or lower or configured to operate in a bandwidth limited to 6 physical resource blocks (PRBs). For example, the UE may be an NB-IoT UE having a channel bandwidth limited to 200 kHz or lower. Alternatively, the UE is an MTC UE configured to operate in a bandwidth limited to 6 PRBs, and may be a BL UE or a CE UE.

Through the above-described operation, the NB-IoT UE or the BL/CE UE may receive multicast data from a Base Station (BS) through SC-PTM.

Figure 2:
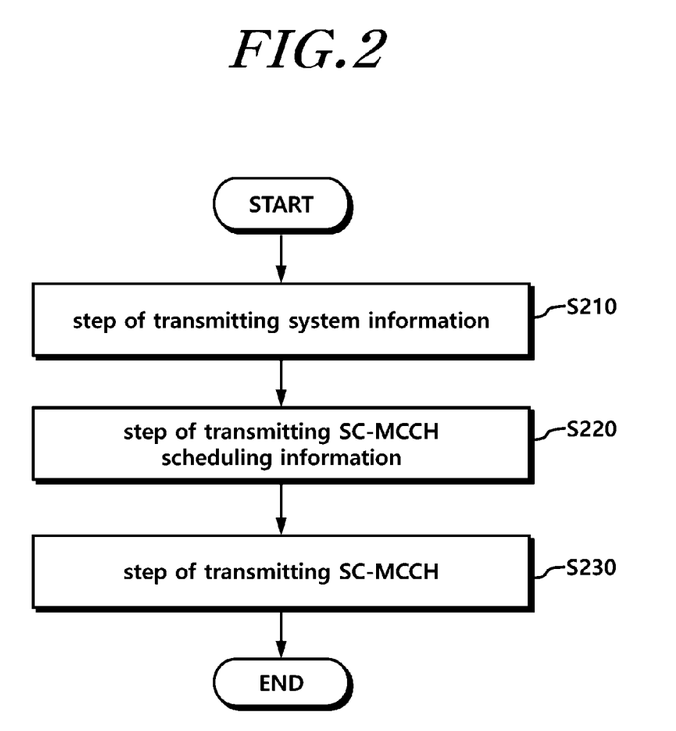
FIG. 2 is a flowchart illustrating operation of a base station (BS) according to an embodiment.

FIG. 2 is a flowchart illustrating operations of a base station (BS) according to an embodiment.

In a method of transmitting single-cell multicast data, a BS according to an embodiment may perform i) transmitting carrier information for Single Cell-Multicast Control Channel (SC-MCCH) reception through system information, ii) transmitting a PDCCH including SC-MCCH scheduling information based on the carrier information, and ii) transmitting a PDSCH including an SC-MCCH to a UE based on the SC-MCCH scheduling information. In this case, the UE is configured to be allowed to access a network service having a channel bandwidth limited to about 200 kHz or configured to operate in a bandwidth limited to 6 PRBs.

Referring to FIG. 2, the BS may transmit the carrier information for SC-MCCH reception through system information in S210. For example, the BS may transmit system information block type 20 (SystemInformationBlock-Type20). The system information may contain various pieces of information for SC-MCCH reception.

For example, the system information may contain the maximum number of repeated transmissions of the PDCCH including SC-MCCH scheduling information. For example, the system information may contain information on the maximum number of repeated transmissions of the PDCCH including scheduling information of a subframe in which the SC-MCCH is transmitted. That is, the SC-MCCH scheduling information is transmitted to the UE through the PDCCH, and the UE may identify the SC-MCCH scheduling information by repeatedly receiving the corresponding PDCCH through the maximum number of repeated transmissions of the PDCCH of the system information.

For another example, the system information may contain start subframe information in a PDCCH common search space for monitoring the SC-MCCH scheduling information. For example, the system information may contain information on a common search space of the PDCCH including the SC-MCCH scheduling information. The UE may identify information on the start subframe in the common search space of the repeatedly received PDCCH as the system information and monitor the corresponding common search space to identify the SC-MCCH scheduling information.

The BS may transmit the PDCCH including the SC-MCCH scheduling information to the UE based on the carrier information in S220. For example, the BS may transmit the SC-MCCH scheduling information through the PDCCH based on at least one of a maximum number of repeated transmissions of the PDCCH including the SC-MCCH scheduling information transmitted through the system information and start subframe information in the common search space. As described above, the SC-MCCH is mapped to the DL-SCH and transmitted to the UE, so that the BS may transmit the SC-MCCH scheduling information on the PDCCH and transmit the SC-MCCH through the PDSCH indicated by the SC-MCCH scheduling information. To this end, the UE performs monitoring to receive the SC-MCCH scheduling information on the PDCCH. Meanwhile, the SC-MCCH scheduling information may be identified using a Single-Cell Radio Network Temporary Identifier (SC-RNTI). That is, the BS may transmit the SC-MCCH scheduling information scrambled with the SC-RNTI.

The BS may transmit the PDSCH including the SC-MCCH to the UE based on the SC-MCCH scheduling information in S230. For example, when the BS identifies information on a subframe in which the SC-MCCH is transmitted as the UE decodes the SC-MCCH scheduling information, the BS may transmit the SC-MCCH through the corresponding subframe and radio resources. As described above, the SC-MCCH may be repeatedly transmitted through the PDSCH and through a plurality of subframes. Thereafter, the BS may transmit an SC-MTCH. The SC-MTCH may be also repeatedly transmitted through a plurality of subframes.

Meanwhile, the UE is configured to be allowed to access a network service having a channel bandwidth limited to about 200 kHz or configured to operate in a bandwidth limited to 6 PRBs. For example, the UE may be an NB-IoT UE having a channel bandwidth limited to about 200 kHz or lower. Alternatively, the UE is an MTC UE configured to operate in a bandwidth limited to 6 PRBs, and may be a BL UE or a CE UE.

Through the above-described operation, the NB-IoT UE or the BL/CE UE may transmit multicast data to the UE through SC-PTM.

Hereinafter, various embodiments will be additionally described. The following description will be made based on the NB-IoT UE, but may be applied to the BL UE or the CE UE as described above. When the following description is applied to the BL or CE UE, the term NPDCCH may be changed to the term MPDCCH and the term NPDSCH may be changed to the term MPDSCH.

First Embodiment: A Method of a UE for Acquiring the SC-MCCH by Identifying SC-MCCH Transmission on the PDCCH Through the SC-RNTI When the UE is configured to decode the PDCCH (hereinafter, referred to as a PDCCH for convenience of description, but may be an MPDCCH or an NPDCCH) which is CRC-scrambled with the SC-RNTI, the UE should decode the PDCCH and the PDSCH (hereinafter, referred to as a PDSCH for convenience of description but may be an MPDSCH or an NPDSCH) addressed by the PDCCH. SC-MCCH transmission, associated radio resources, and MCS may be indicated on the PDCCH.

The SC-PTM-capable BL UE, CE UE, or NB-IoT UE may receive SC-MCCH information on the PDSCH/MPDSCH/NPDSCH according to detailed scheduling information scrambled with the SC-RNTI on the PDCCH/MPDCCH/NPDCCH. The BS may transmit SC-MCCH information on the PDSCH/DL-SCH associated (with the scrambled/addressed detailed scheduling information) on the PDCCH.

A relative PDSCH start time for the PDCCH may be signaled through one of a scheduling message, scheduling information, and DCI. For example, with respect to the NPDCCH having the NB-IoT DCI format (DCI format N1, N2, etc.) ending at subframe n, the UE should decode the NPDSCH of N successive NB-IoT downlink subframes, starting from an n+k$^{th}$ downlink subframe (where k is 5 or some other integer). Here, in the NB-IoT downlink subframes, a subframe used for an SI message is excluded.

In an example of operation thereof, the BS indicates one or more pieces of information on the number of repeated transmissions of the PDCCH for indicating the scheduled PDSCH for transmitting SC-MCCH information (for example, the maximum number of repetitions for PDCCH common search space for the SC-MCCH, and in another example, the number of repetitions of the valid subframe for PDCCH common search space for the SC-MCCH), transmission occasion information for PDCCH common search space for the SC-MCCH, transmission period information for PDCCH common search space for the SC-MCCH, start subframe information for PDCCH common search space for the SC-MCCH, and radio frame information for PDCCH common search space for the SC-MCCH.

For example, the information may be included in system information block type 20 (SystemInformationBlockType20 or SystemInformationBlockType20-NB) containing information required for acquiring control information associated with MBMS transmission using SC-PTM.

Alternatively, the information may be included in system information block type 2 (SystemInformationBlockType2 or SystemInformationBlockType2-NB) containing common radio resource configuration information for all UEs.

Alternatively, the information may be indicated by the UE through dedicated signaling.

Alternatively, the information may be indicated by the UE through dedicated signaling of the BS in response to a request from the UE.

Alternatively, in the information, a transmission duration value may be used for the UE with respect to the number of subframes of the NPDCCH.

In another example of the operation thereof, the BS may provide information on the number of repeated transmissions of the PDCCH indicating the scheduled PDSCH for transmitting SC-MCCH information (for example, the maximum number of repetitions for PDCCH common search space for the SC-MCCH, or in another example, the number of repetitions of the valid subframe for PDCCH common search space for the SC-MCCH) based on sc-mcch-duration information.

In another example of the operation thereof, the BS may define a transmission period of a PDCCH common search space for the SC-MCCH as new information distinguished from sc-mcch-RepetitionPeriod information and provide the newly defined information.

In another example of the operation thereof, the BS may provide the transmission period of a PDCCH common search space for the SC-MCCH based on the sc-mcch-RepetitionPeriod information.

In another example of the operation thereof, the BS may provide start subframe information for a PDCCH common search space for the SC-MCCH based on the sc-mcch-RepetitionPeriod information.

In another method, the BS may indicate narrow-band index information for the PDCCH indicating the scheduled PDSCH for transmitting SC-MCCH information (for example, narrow-band index information for PDCCH common search space for the SC-MCCH). For example, the narrow-band index information may be included in system information block type 20 (SystemInformationBlockType20 or SystemInformationBlockType20-NB). In another example, the narrow-band index information may be indicated by the UE through dedicated signaling.

The UE decodes SC-MCCH scheduling information through the SC-RNTI on the PDCCH within the above-described transmission period in order to acquire detailed scheduling information of the SC-MCCH information. The UE acquires detailed scheduling information on the PDSCH for transmitting the SC-MCCH information through the PDCCH scrambled/indicated/addressed by the SC-RNTI. The UE may receive the SC-MCCH information by acquiring at least one of a relative PDSCH start time for the PDSCH, the number of repetitions of the PDSCH subframe, the number of transmission repetitions, a transmission duration within the subframe, and the number of repetitions of the valid subframe.

Second Embodiment: A Method of Acquiring an SC-MCCH Through Detailed Scheduling Information on System Information The SC-MCCH is transmitted at every SC-MCCH repetition period. In order to efficiently use the periodically transmitted SC-MCCH, the BS may transmit the SC-MCCH for the SC-PTM-capable BL UE, CE UE, or NB-IoT UE without PDCCH.

For example, the BS may include detailed time or frequency domain scheduling information for receiving SC-MCCH information of the BL UE or the CE UE on system information block type 20 (SystemInformationBlockType20 or SystemInformationBlockType20-NB) containing information required for acquiring control information associated with MBMS transmission using SC-PTM by the BS.

For example, the BS may include narrow-band (index) information for broadcasting the SC-MCCH to the BL UE and the UE that supports CE through system information block type 20.

In another example, the BS may include frequency-hopping configuration information for broadcasting the SC-MCCH to the BL UE and the UE that supports CE through system information block type 20.

In another example, the BS may include transmission block size (TBS) information for broadcasting the SC-MCCH to the BL UE and the UE that supports CE through system information block type 20.

In another example, the BS may include OFDM starting symbol information of the PDSCH for broadcasting the SC-MCCH to the BL UE and the UE that supports CE through system information block type 20.

In another example, the BS may include SC-MCCH window period information for broadcasting the SC-MCCH to the BL UE and the UE that supports CE through system information block type 20.

In another example, the BS may include the SC-MCCH window length for broadcasting the SC-MCCH to the BL UE and the UE that supports CE through system information block type 20.

In another example, the BS may include SC-MCCH repetition pattern information (for example, every second radio frame or every fourth radio frame) for broadcasting the SC-MCCH to the BL UE and the UE that supports CE through system information block type 20. For example, the SC-MCCH repetition pattern may indicate a radio frame within the SC-MCCH repetition period.

In another example, the BS may include radio frame offset information on the SC-MCCH window for broadcasting the SC-MCCH to the BL UE and the UE that supports CE through system information block type 20.

In another example, the BS may include subframe use pattern information within the radio frame on the SC-MCCH window for broadcasting the SC-MCCH to the BL UE and the UE that supports CE through system information block type 20.

In another example, the BS may include SC-MCCH-effective downlink subframe bitmap information for broadcasting the SC-MCCH to the BL UE and the UE that supports CE through system information block type 20.

In another example, the BS may include detailed time or frequency domain scheduling information for receiving SC-MCCH information of the NB-IoT UE on system information block type 20 (SystemInformationBlockType20 or SystemInformationBlockType20-NB) containing information required for acquiring control information associated with MBMS transmission using SC-PTM by the BS.

For example, the BS may include transmission block size information for broadcasting the SC-MCCH to the NB-IoT UE through system information block type 20.

In another example, the BS may include transmission SC-MCCH window period information for broadcasting the SC-MCCH to the NB-IoT UE through system information block type 20.

In another example, the BS may include the SC-MCCH window length for broadcasting the SC-MCCH to the NB-IoT UE through system information block type 20.

In another example, the BS may include SC-MCCH radio frame offset information for broadcasting the SC-MCCH to the NB-IoT UE through system information block type 20.

In another example, the BS may include at least one of an SC-MCCH first subframe, a subframe offset, and start subframe information for broadcasting the SC-MCCH to the NB-IoT UE through system information block type 20.

In another example, the BS may include SC-MCCH-effective downlink subframe bitmap information for broadcasting the SC-MCCH to the NB-IoT UE through system information block type 20.

In another example, the BS may include SC-MCCH repetition pattern information (for example, every second radio frame or every fourth radio frame) for broadcasting the SC-MCCH to the NB-IoT UE through system information block type 20. For example, the SC-MCCH repetition pattern may indicate a radio frame within the SC-MCCH window period.

In another example, the BS may include OFDM starting symbol information of the PDSCH used for broadcasting the SC-MCCH to the NB-IoT UE through system information block type 20.

In another example, system information block type 20, described above, may be scheduled independently from the system information block type (SystemInformationBlockType20) for the typical general LTE UE, and may be provided as a distinguished message (SystemInformationBlockType20-BR or SystemInformationBlockType20-NB).

In another example, the BS may differently configure the SC-MTCH-specific repetition period through the SC-MCCH window.

Hereinafter, a reception operation of the BL UE, the CE UE, or the NB-IoT UE will be described.

For example, when the UE enters the cell broadcasting system information block type 20 (for example, SystemInformationBlockType20-BR or SystemInformationBlockType20-NB), the UE may receive and accumulate an SC-MCCH message (SCPTMConfiguration message) on the DL-SCH in the narrow band provided by narrow-band information for broadcasting the SC-MCCH, from the start of the SC-MCCH window or to successful decoding of accumulated SC-MCCH message transmission.

In another example, when the UE enters the cell broadcasting system information block type 20 (for example, SystemInformationBlockType20-BR or SystemInformationBlockType20-NB), the UE may receive and accumulate the SC-MCCH messages (SCPTMConfiguration message) on the DL-SCH in the narrow band provided by narrow-band information for broadcasting the SC-MCCH in the radio frame by SC-MCCH repetition pattern information and the subframe according to subframe information provided by downlink subframe bitmap information.

In another example, when the UE enters the cell broadcasting system information block type 20 (for example, SystemInformationBlockType20-BR or SystemInformationBlockType20-NB), the UE may receive and accumulate the SC-MCCH message (SCPTMConfiguration message) on the DL-SCH from the start of the SC-MCCH window to the end of the SC-MCCH window length.

In another example, when the UE enters the cell broadcasting system information block type 20 (for example, SystemInformationBlockType20-BR or SystemInformationBlockType20-NB), the UE may receive and accumulate the SC-MCCH message (SCPTMConfiguration message) on the DL-SCH in the radio frame by SC-MCCH repetition pattern information and the subframe according to subframe information provided by downlink subframe bitmap information.

In another example, when the UE enters the cell broadcasting system information block type 20 (for example, SystemInformationBlockType20-BR or SystemInformationBlockType20-NB), the UE may receive and accumulate the SC-MCCH message (SCPTMConfiguration message) on the DL-SCH, from the start of the SC-MCCH window to the end of the SC-MCCH window length.

In another example, when the UE enters the cell broadcasting system information block type 20 (for example, SystemInformationBlockType20-BR or SystemInformationBlockType20-NB), the UE may receive and accumulate the SC-MCCH message (SCPTMConfiguration message) on the DL-SCH in the radio frame by SC-MCCH repetition pattern information and the subframe according to subframe information provided by downlink subframe bitmap information.

In another example, when the UE enters the cell broadcasting system information block type 20 (for example, SystemInformationBlockType20-BR or SystemInformationBlockType20-NB), the UE may receive and accumulate SC-MCCH message transmission, starting from a radio frame offset of the window/radio frame of the repetition pattern within the next repetition period/radio frame provided by a valid downlink subframe bitmap or until successful decoding of the accumulated SC-MCCH message except for the subframe used for transmitting NPSS, NSSS, MasterInformationBlock-NB and SystemInformationBlockType1-NB.

In another example, if decoding is not possible from the SC-MCCH message accumulated up to the end of the SC-MCCH window, the UE repeats the reception and the accumulation of SC-MCCH transmission on the DL-SCH within the next SC-MCCH window occasion.

In another example, the UE may accumulate SC-MCCH information through a plurality of SC-MCCH windows.

In another example, the UE may accumulate SC-MCCH information through a plurality of SC-MCCH windows within one/the same SC-MCCH modification period.

In another example, if the UE reaches the SC-MCCH modification period, the UE may newly start reception of a transmitted SC-MCCH message.

In another example, when the UE receives an SC-MCCH information change notification, the UE may newly start the reception of a transmitted SC-MCCH message.

Third Embodiment: A Method of Acquiring an SC-MCCH Through Detailed Scheduling Information on System Information A transmission period specifying the SC-MCCH may be designated and repeatedly transmitted within the corresponding period. The BS may transmit the SC-MCCH for the SC-PTM-capable BL UE, CE UE, or NB-IoT UE without PDCCH.

For example, detailed time or frequency domain scheduling information for receiving SC-MCCH information of the BL UE or the CE UE may be included in system information block type 20 (SystemInformationBlockType20 or SystemInformationBlockType20-NB) containing information required for acquiring control information associated with MBMS transmission using SC-PTM by the BS.

For example, the BS may include narrow-band (index) information for broadcasting the SC-MCCH to the BL UE and the UE that supports CE through system information block type 20.

In another example, the BS may include frequency-hopping configuration information for broadcasting the SC-MCCH to the BL UE and the UE that supports CE through system information block type 20.

In another example, the BS may include transmission block size (TBS) information for broadcasting the SC-MCCH to the BL UE and the UE that supports CE through system information block type 20.

In another example, the BS may include OFDM starting symbol information of the PDSCH for broadcasting the SC-MCCH to the BL UE and the UE that supports CE through system information block type 20.

In another example, the BS may include SC-MCCH transmission period/period/repetition period information for broadcasting the SC-MCCH to the BL UE and the UE that supports CE through system information block type 20.

In another example, the BS may include at least one of an SC-MCCH transmission duration, the number of repetitions, and information on the number of repetitions of the valid subframe for broadcasting the SC-MCCH to the BL UE and the UE that supports CE through system information block type 20.

In another example, the BS may include SC-MCCH transmission pattern/repetition pattern information (for example, every second radio frame or every fourth radio frame) for broadcasting the SC-MCCH to the BL UE and the UE that supports CE through system information block type 20. For example, the SC-MCCH transmission pattern/repetition pattern may indicate radio frames within the SC-MCCH transmission period/period.

In another example, the BS may include SC-MCCH radio frame offset information for broadcasting the SC-MCCH to the BL UE and the UE that supports CE through system information block type 20.

In another example, the BS may include at least one of a first subframe of the SC-MCCH, a subframe offset, and start subframe information used for broadcasting the SC-MCCH to the BL UE and the UE that supports CE through system information block type 20.

In another example, the BS may include SC-MCCH downlink subframe bitmap/valid downlink subframe bitmap information for broadcasting the SC-MCCH the BL UE and the UE that supports CE through system information block type 20.

In another example, the BS may include detailed time or frequency domain scheduling information for receiving SC-MCCH information of the NB-IoT UE on system information block type 20 (SystemInformationBlockType20 or SystemInformationBlockType20-NB) containing information required for acquiring control information associated with MBMS transmission using SC-PTM by the BS.

For example, the BS may include transmission block size information for broadcasting the SC-MCCH to the NB-IoT UE through system information block type 20.

For example, the BS may include SC-MCCH transmission period/period/repetition period information for broadcasting the SC-MCCH to the NB-IoT UE through system information block type 20.

In another example, the BS may include at least one of an SC-MCCH transmission duration, the number of repetitions, and information on the number of repetitions of the valid subframe for broadcasting the SC-MCCH to the NB-IoT UE through system information block type 20.

In another example, the BS may include SC-MCCH radio frame offset information for broadcasting the SC-MCCH to the NB-IoT UE through system information block type 20.

In another example, the BS may include at least one of an SC-MCCH first subframe, a subframe offset, and start subframe information for broadcasting the SC-MCCH to the NB-IoT UE through system information block type 20.

In another example, the BS may include SC-MCCH-effective downlink subframe bitmap information for broadcasting the SC-MCCH to the NB-IoT UE through system information block type 20.

In another example, the BS may include SC-MCCH transmission pattern/repetition pattern information (for example, every second radio frame or every fourth radio frame) for broadcasting the SC-MCCH to the NB-IoT UE through system information block type 20. For example, the SC-MCCH transmission pattern/repetition pattern may indicate radio frames within the SC-MCCH transmission period.

In another example, the BS may include OFDM starting symbol information of the PDSCH for broadcasting the SC-MCCH to the NB-IoT UE through system information block type 20.

In another example, system information block type 20, described above, may be scheduled independently from the system information block type (SystemInformationBlockType20) for the general LTE UE, and may be provided as a distinguished message ((SystemInformationBlockType20-BR or SystemInformationBlockType20-NB).

Hereinafter, a reception operation of the BL UE, the CE UE, or the NB-IoT UE will be described.

For example, when the UE enters the cell broadcasting system information block type 20 (for example, SystemInformationBlockType20-BR or SystemInformationBlockType20-NB) (or when the UE enters the cell broadcasting system information block type 20 (for example, SystemInformationBlockType20-BR or SystemInformationBlockType20-NB) and the UE is interested in data reception through SC-PTM or data reception is indicated), the UE may receive and accumulate the SC-MCCH message (SCPTMConfiguration message) on the DL-SCH in the narrow band provided by narrow-band information used for broadcasting the SC-MCCH, from the start of the next transmission period to successful decoding of transmission of the accumulated SC-MCCH message.

In another example, when the UE enters the cell broadcasting system information block type 20 [for example, SystemInformationBlockType20-BR or SystemInformationBlockType20-NB] [or when the UE enters the cell broadcasting system information block type 20 (for example, SystemInformationBlockType20-BR or SystemInformationBlockType20-NB) and the UE is interested in data reception through SC-PTM or data reception is indicated], the UE may receive and accumulate the SC-MCCH message (SCPTMConfiguration message) on the DL-SCH in the narrow band provided by narrow-band information used for broadcasting the SC-MCCH, from the start of the next transmission period to the SC-MCCH transmission duration.

In another example, when the UE enters the cell broadcasting system information block type 20 (for example, SystemInformationBlockType20-BR or SystemInformationBlockType20-NB) or when the UE enters the cell broadcasting system information block type 20 (for example, SystemInformationBlockType20-BR or SystemInformationBlockType20-NB) and the UE is interested in data reception through SC-PTM or data reception is indicated, the UE may receive and accumulate the SC-MCCH message (SCPTMConfiguration message) on the DL-SCH in the narrow band provided by narrow-band information used for broadcasting the SC-MCCH in a radio frame by SC-MCCH transmission pattern information and a subframe according to subframe information provided by downlink subframe bitmap information.

In another example, when the UE enters the cell broadcasting system information block type 20 (for example, SystemInformationBlockType20-BR or SystemInformationBlockType20-NB) or when the UE enters the cell broadcasting system information block type 20 (for example, SystemInformationBlockType20-BR or SystemInformationBlockType20-NB) and the UE is interested in data reception through SC-PTM or data reception is indicated, the UE may receive and accumulate the SC-MCCH message (SCPTMConfiguration message) on the DL-SCH, from the start of the next transmission period to successful decoding of transmission of the accumulated SC-MCCH message.

In another example, when the UE enters the cell broadcasting system information block type 20 (for example, SystemInformationBlockType20-BR or SystemInformationBlockType20-NB) or when the UE enters the cell broadcasting system information block type 20 (for example, SystemInformationBlockType20-BR or SystemInformationBlockType20-NB) and the UE is interested in data reception through SC-PTM or data reception is indicated, the UE may receive and accumulate the SC-MCCH message (SCPTMConfiguration message) on the DL-SCH, from the start of the next transmission period to the SC-MCCH transmission duration.

In another example, i) when the UE enters the cell broadcasting system information block type 20 (for example, SystemInformationBlockType20-BR or SystemInformationBlockType20-NB) or ii) when the UE enters the cell broadcasting system information block type 20 (for example, SystemInformationBlockType20-BR or SystemInformationBlockType20-NB) and the UE is interested in data reception through SC-PTM or data reception is indicated, the UE may receive and accumulate the SC-MCCH message (SCPTMConfiguration message) on the DL-SCH in the narrow band provided by narrow-band information used for broadcasting the SC-MCCH in a radio frame by SC-MCCH transmission pattern information and a subframe according to subframe information provided by downlink subframe bitmap information.

In another example, i) when the UE enters the cell broadcasting system information block type 20 (for example, SystemInformationBlockType20-BR or SystemInformationBlockType20-NB) or ii) when the UE enters the cell broadcasting system information block type 20 (for example, SystemInformationBlockType20-BR or SystemInformationBlockType20-NB) and the UE is interested in data reception through SC-PTM or data reception is indicated, the UE may receive and accumulate the SC-MCCH message, starting from a radio frame offset of the next transmission period/next repetition period/radio frame of a repetition pattern within the next repetition period/radio frame provided by a valid downlink subframe bitmap or until successful decoding of the accumulated SC-MCCH message except for the subframe used for transmitting NPSS, NSSS, MasterInformationBlock-NB and SystemInformationBlockType1-NB.

In another example, if the UE reaches the SC-MCCH modification period, the UE may newly start reception of a transmitted SC-MCCH message.

In another example, when the UE receives an SC-MCCH information change notification, the UE may newly start the reception of a transmitted SC-MCCH message.

In another example, the UE may accumulate the SC-MCCH information through a plurality of SC-MCCH transmission periods within one/the same SC-MCCH modification period.

Fourth Embodiment: A Method of Using a Broadcast HARQ Process for SC-MCCH Reception FIG. 3 illustrates an example of the MAC entity structure according to an embodiment.

Figure 3:
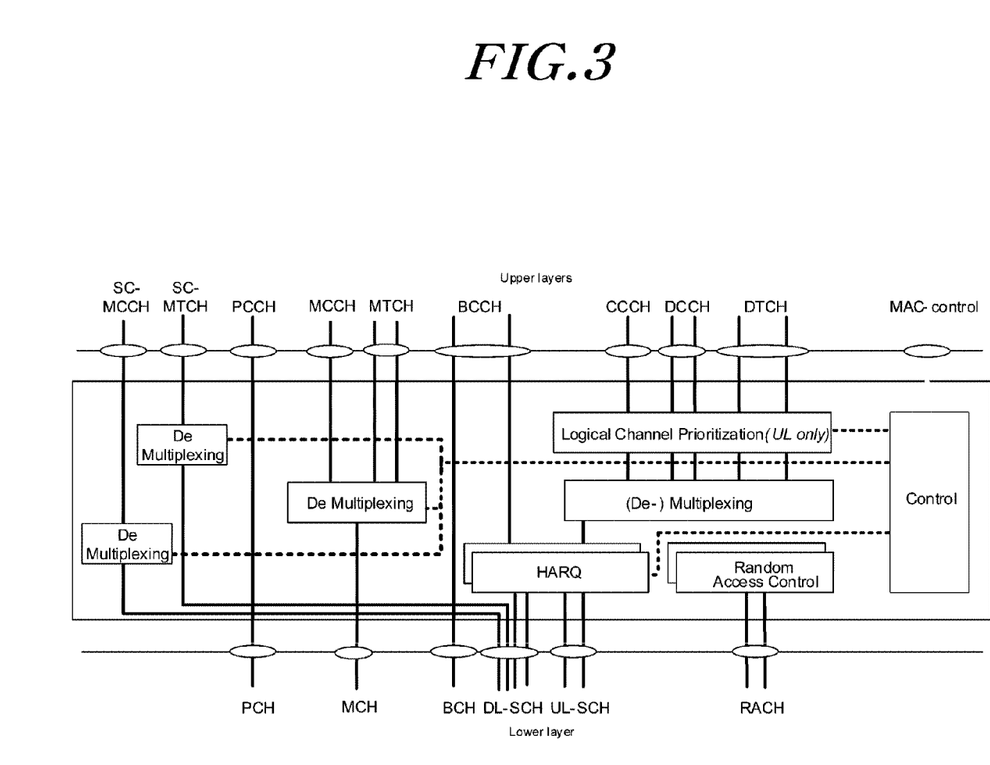
FIG. 3 illustrates an example of a MAC entity structure according to an embodiment.

As illustrated in FIG. 3, SC-MCCH data applied to the general LTE UE does not use an HARQ process. The SC-MCCH data applied to the general LTE UE is received through the DL-SCH and directly transmitted to a higher layer through de-multiplexing. If the broadcast HARQ process is used for SC-MCCH reception, an MAC entity (or UE) may operate as follows.

For example, the UE may use the broadcast HARQ process for SC-MCCH reception. If downlink control information (downlink scheduling) is received at this TTI on the PDCCH for the G-RNTI, one or more pieces of downlink control information (for example, at least one of resource allocation information, MCS, the number of repetitions, and the number of repetitions of the DCI subframe), and a redundancy version may be indicated to the broadcast HARQ process. The UE may perform combining on repeated receptions in the broadcast HARQ process.

When the data is successfully decoded, a decoded MAC PDU is transmitted to the higher layer.

In another example, the UE may not use the broadcast HARQ process for SC-MCCH reception. The UE may perform combining on repeated transmissions in the MAC entity/DL-SCH.

As described above, according to the present embodiment, SC-MCCH information may be effectively processed by the BL UE, the CE UE, or the NB-IoT UE. Accordingly, the UE may effectively receive multicast data.

The UE and BS according to the present embodiments described with reference to FIG. 1 to FIG. 3 will be described one more time in connection with the accompanying drawings.

Figure 4:
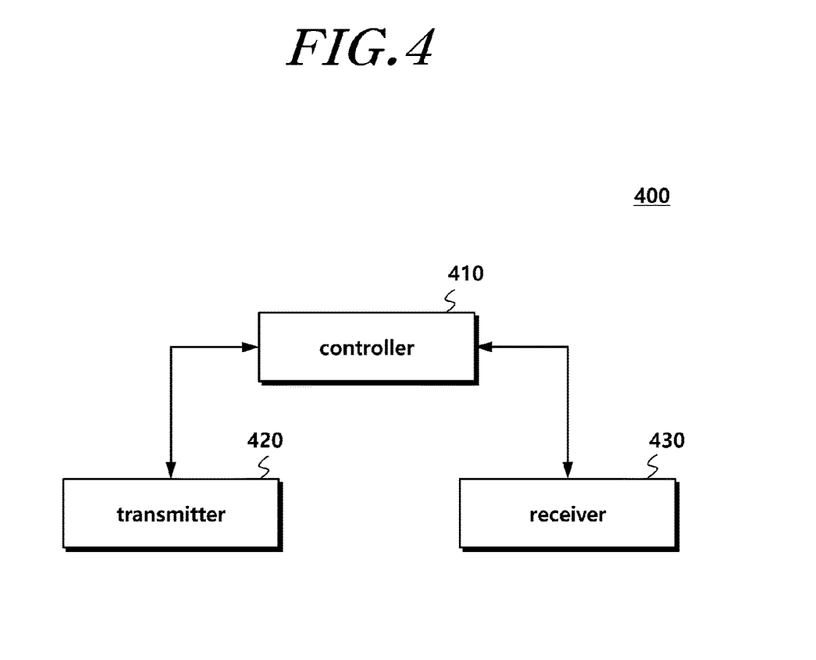
FIG. 4 is a block diagram illustrating a UE according to an embodiment.

FIG. 4 is a block diagram illustrating a UE according to an embodiment.

Referring to FIG. 4, a UE 400 receiving single-cell multicast data includes a receiver 430 for receiving carrier information for Single Cell-Multicast Control Channel (SC-MCCH) reception through system information and a controller 410 for monitoring SC-MCCH scheduling information on a PDCCH based on the carrier information. The receiver 430 receives the SC-MCCH on a PDSCH based on the SC-MCCH scheduling information. The UE is configured to be allowed to access a network service having a channel bandwidth limited to about 200 kHz or configured to operate in a bandwidth limited to 6 PRBs.

The receiver 430 may receive carrier information for SC-MCCH reception through system information block type 20 (SystemInformationBlockType20). The system information may contain various pieces of information for SC-MCCH reception.

For example, the system information may contain the maximum number of repeated transmissions of the PDCCH including SC-MCCH scheduling information. For example, the system information may contain information on a maximum number of repeated transmissions of the PDCCH including scheduling information of a subframe in which the SC-MCCH is transmitted. That is, the SC-MCCH scheduling information is received by the UE 400 through the PDCCH, and the UE 400 may identify the SC-MCCH scheduling information by repeatedly receiving the corresponding PDCCH through the maximum number of repeated transmissions of the PDCCH of the system information.

In another example, the system information may contain start subframe information in PDCCH common search space for monitoring the SC-MCCH scheduling information. For example, the system information may contain information on common search space of the PDCCH including the SC-MCCH scheduling information. The controller 410 may identify information on a start subframe in common search space of the repeatedly received PDCCH as the system information and monitor the corresponding common search space to identify the SC-MCCH scheduling information.

Further, the controller 410 may identify the SC-MCCH scheduling information by identifying at least one of the maximum number of repeated transmissions of the PDCCH including the SC-MCCH scheduling information and the start subframe information of the common search space through the system information. As described above, the SC-MCCH is mapped to the DL-SCH and transmitted to the UE 400, so that the UE 400 may receive the SC-MCCH through the PDSCH based on the SC-MCCH scheduling transmitted on the PDCCH. To this end, the controller 410 may perform monitoring to receive the SC-MCCH scheduling information on the PDCCH. Meanwhile, the SC-MCCH scheduling information may be identified using a Single-Cell Radio Network Temporary Identifier (SC-RNTI).

In addition, the controller 410 effectively receives multicast data through an SC-PTM transmission scheme required for implementing the above-described embodiments and controls the general operation of the UE 400 according to the reception of the multicast control information.

Meanwhile, the receiver 430 may receive the SC-MCCH on the PDSCH through the identified SC-MCCH scheduling information. As described above, the SC-MCCH may be repeatedly received in a plurality of subframes through the PDSCH.

Further, the receiver 430 may receive single-cell multicast control information of the SC-MCCH and receive an SC-MTCH based on the single-cell multicast control information. The SC-MTCH may be also repeatedly received through a plurality of subframes.

In addition, the receiver 430 receives downlink control information, data, and messages from the BS through a corresponding channel. A transmitter 420 transmits uplink control information, data, and messages to the BS through a corresponding channel.

Figure 5:
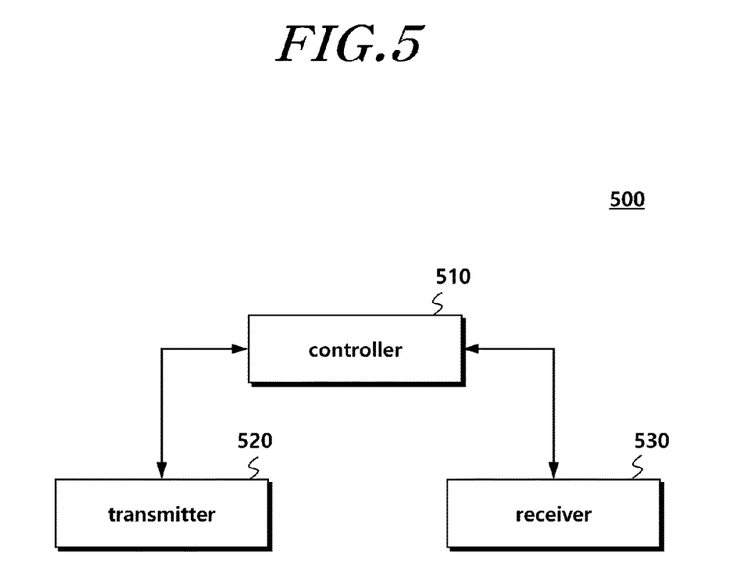
FIG. 5 is a block diagram illustrating a BS according to an embodiment.

FIG. 5 is a block diagram illustrating the configuration of a BS according to an embodiment.

Referring to FIG. 5, a BS 500 transmitting single-cell multicast data includes a transmitter 520 for transmitting carrier information for Single Cell-Multicast Control Channel (SC-MCCH) reception through system information, transmitting a PDCCH including SC-MCCH scheduling information to a UE based on the carrier information, and transmitting a PDSCH including an SC-MCCH the UE based on the SC-MCCH scheduling information. In this case, the UE is configured to be allowed to access a network service having a channel bandwidth limited to about 200 kHz or configured to operate in a bandwidth limited to 6 PRBs.

For example, the transmitter 520 may transmit system information block type 20 (SystemInformationBlock-Type20). The system information may contain various pieces of information for SC-MCCH reception by the UE.

For example, the system information may contain the maximum number of repeated transmissions of the PDCCH including SC-MCCH scheduling information. For example, the system information may contain information on the maximum number of repeated transmissions of the PDCCH, including scheduling information of the subframe in which the SC-MCCH is transmitted. That is, the SC-MCCH scheduling information is received by the UE through the PDCCH, and the UE may identify the SC-MCCH scheduling information by repeatedly receiving the corresponding PDCCH through the maximum number of repeated transmissions of the PDCCH of the system information.

In another example, the system information may contain start subframe information in PDCCH common search space for monitoring the SC-MCCH scheduling information. For example, the system information may contain information on common search space of the PDCCH including the SC-MCCH scheduling information. The UE may identify information on the start subframe in the common search space of the repeatedly received PDCCH as the system information and monitor the corresponding common search space to identify the SC-MCCH scheduling information.

Further, the transmitter 520 may transmit the SC-MCCH scheduling information through the PDCCH based on at least one of a maximum number of repeated transmissions of the PDCCH including the SC-MCCH scheduling information and start subframe information of the common search space transmitted through the system information. As described above, the SC-MCCH is mapped to the DL-SCH and transmitted to the UE, so that the BS 500 may transmit the SC-MCCH scheduling information on the PDCCH and transmit the SC-MCCH through the PDSCH indicated by the SC-MCCH scheduling information. To this end, the UE performs monitoring to receive the SC-MCCH scheduling information on the PDCCH. Meanwhile, the SC-MCCH scheduling information may be identified using a Single-Cell Radio Network Temporary Identifier (SC-RNTI). That is, a controller 510 may transmit the SC-MCCH scheduling information scrambled with the SC-RNTI.

When information of the subframe in which the SC-MCCH is transmitted is identified as the UE decodes the SC-MCCH scheduling information, the transmitter 520 may transmit the SC-MCCH through the corresponding subframe and radio resources. As described above, the SC-MCCH may be repeatedly transmitted through the PDSCH and through a plurality of subframes. Thereafter, the transmitter 520 may transmit an SC-MTCH. The SC-MTCH may also be repeatedly transmitted through a plurality of subframes.

In addition, the controller 510 effectively transmits multicast data through an SC-PTM transmission scheme required for implementing the above-described embodiments and controls the general operation of the BS 500 according to the transmission of the multicast control information to the UE.

The transmitter 520 and a receiver 530 may be used for transmitting and receiving signals, messages, or data required for implementing the present disclosure to and from the UE.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

The above embodiments of the present disclosure have been described only for illustrative purposes, and those skilled in the art will appreciate that various modifications and changes may be made thereto without departing from the scope and spirit of the invention. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A method of receiving single-cell multicast data by a user equipment (UE), the method comprising:
    receiving carrier information for Single Cell-Multicast Control Channel (SC-MCCH) reception through system information;
    monitoring SC-MCCH scheduling information on a physical downlink control channel (PDCCH) based on the carrier information; and
    receiving an SC-MCCH on a physical downlink shared channel (PDSCH) based on the monitored SC-MCCH scheduling information,
    wherein the UE is configured to access a network service having a channel bandwidth limited to about 200 kHz or lower or to operate in a bandwidth limited to 6 physical resource blocks (PRBs),
    wherein the SC-MCCH scheduling information is identified using a Single-Cell Radio Network Temporary Identifier (SC-RNTI), and
    wherein the system information corresponds to system information block type 20 (SystemInformationBlock-Type20).

2. The method of claim 1, wherein the system information includes a maximum number of repeated transmissions of the PDCCH including the SC-MCCH scheduling information.

3. The method of claim 1, wherein the system information includes start subframe information of a PDCCH common search space for monitoring the SC-MCCH scheduling information.

4. A method of transmitting single-cell multicast data by a base station (BS), the method comprising:
    transmitting carrier information for Single Cell-Multicast Control Channel (SC-MCCH) reception through system information;
    transmitting a physical downlink control channel (PDCCH) including SC-MCCH scheduling information to a user equipment (UE) based on the carrier information; and
    transmitting a physical downlink shared channel (PDSCH) including an SC-MCCH to the UE based on the SC-MCCH scheduling information,
    wherein the UE is configured to access a network service having a channel bandwidth limited to about 200 kHz or lower or operate in a bandwidth limited to 6 physical resource blocks (PRBs),
    wherein the SC-MCCH scheduling information is identified using a Single-Cell Radio Network Temporary Identifier (SC-RNTI), and wherein the system information corresponds to system information block type 20 (SystemInformationBlockType20).

5. The method of claim 4, wherein the system information includes a maximum number of repeated transmissions of the PDCCH including the SC-MCCH scheduling information.

6. The method of claim 4, wherein the system information includes start subframe information of a PDCCH common search space for monitoring the SC-MCCH scheduling information by the UE.

7. A user equipment (UE) for receiving single-cell multicast data, the UE comprising:
  a receiver configured to receive carrier information for Single Cell-Multicast Control Channel (SC-MCCH) reception through system information; and
  a controller configured to monitor SC-MCCH scheduling information on a physical downlink control channel (PDCCH) based on the carrier information,
  wherein the receiver receives an SC-MCCH on a physical downlink shared channel (PDSCH) based on the monitored SC-MCCH scheduling information, and the UE is configured to access a network service having a channel bandwidth limited to about 200 kHz or lower or operate in a bandwidth limited to 6 physical resource blocks (PRBs),
  wherein the SC-MCCH scheduling information is identified using a Single-Cell Radio Network Temporary Identifier (SC-RNTI), and
  wherein the system information corresponds to system information block type 20 (SystemInformationBlockType20).

8. The UE of claim 7, wherein the system information includes a maximum number of repeated transmissions of the PDCCH including the SC-MCCH scheduling information.

9. The UE of claim 7, wherein the system information includes start subframe information of a PDCCH common search space for monitoring the SC-MCCH scheduling information.

* * * * *